Figure 1:
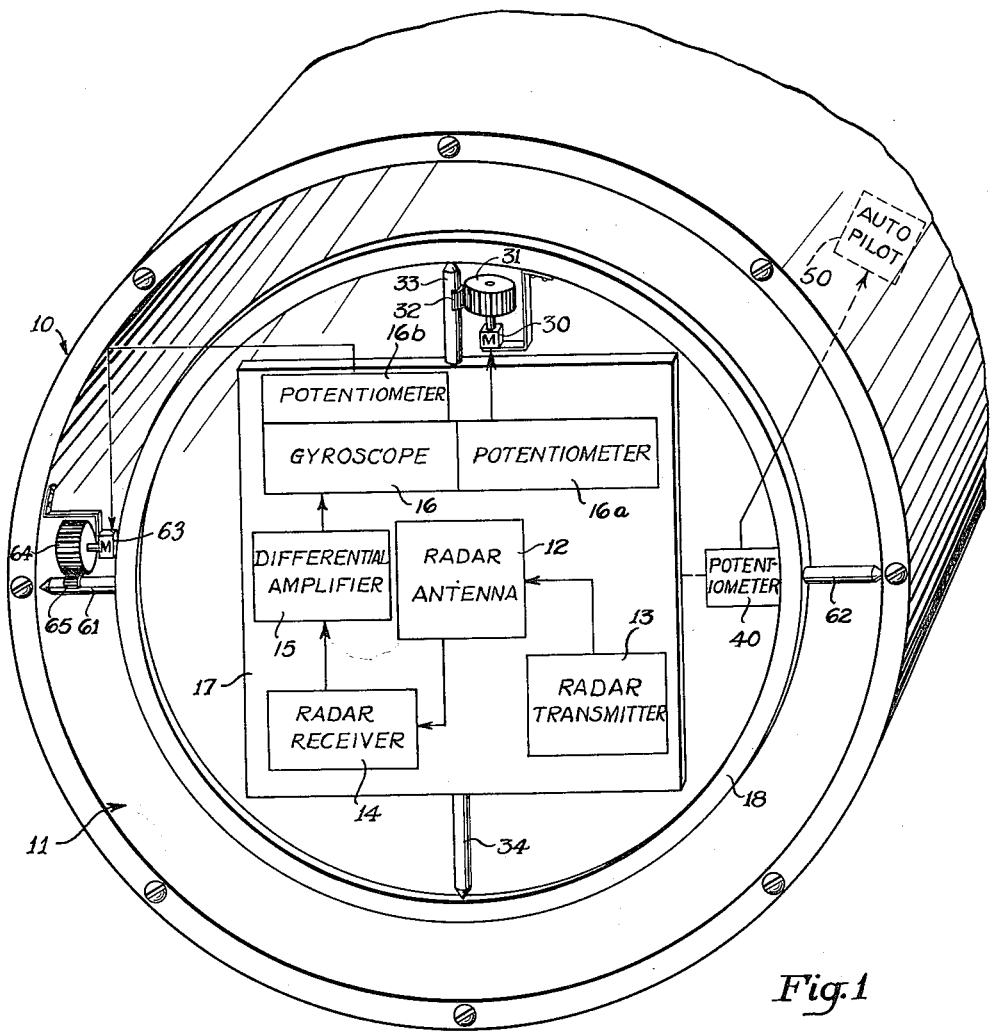

April 2, 1963 P. R. STOUT ET AL 3,084,340
OBJECT TRACKING ANTENNA AND SYSTEM OF MISSILE GUIDANCE
Filed April 3, 1951

INVENTORS
PERRY R. STOUT
HAROLD K. SKRAMSTAD
THEODORE C. MERKLE, JR.
EMMETT C. BAILEY
WESLEY SPANGENBERG
JACOB RABINOW
CHARLES RAUDENBUSH
BY

1

3,084,340
OBJECT TRACKING ANTENNA AND SYSTEM OF MISSILE GUIDANCE
Perry R. Stout, Oakland, Calif., Harold K. Skramstad, Washington, D.C., Theodore C. Merkle, Jr., Berkeley, Calif., Emmett C. Bailey, Washington, D.C., and Wesley Spangenberg and Jacob Rabinow, Takoma Park, and Charles Raudenbush, Bethesda, Md., assignors to the United States of America as represented by the Secretary of the Navy
Filed Apr. 3, 1951, Ser. No. 219,106
3 Claims. (Cl. 343—7)
(Granted under Title 35, U.S. Code (1952), sec. 266)

The present invention relates generally to directional intelligence systems and a stabilized antenna therefor, being primarily concerned in its principal application to the directional guidance of a radio antenna, to keep the antenna heading directed toward a selected object by means of the antenna-to-object bearing information obtained by the radio set, and where desired to utilize the antenna heading thus obtained to guide a missile or other moving vehicle upon which the radio set is mounted to the object.

In general, in its utilization of a directional radio intelligence system, the present invention contemplates the employment of a movably mounted but stabilized directional radio antenna cooperating with radio transmitting and receiving units. The antenna and associated radio equipment are utilized for obtaining the bearing of a selected object from the antenna. This information indicates the direction and amount of discrepancy between the actual antenna heading and the antenna-to-object bearing, and is utilized as an electrical signal to precess a gyroscope carried by the antenna mounting. The gyroscope precession operates a potentiometer also carried by the antenna to deliver a signal to a servo motor or the like for driving the movable antenna mounting, to bring the antenna heading into coincidence with the antenna-to-object bearing. The gyroscope precessing signal is made substantially proportional to and in the direction of the discrepancy between antenna heading and object bearing, so that as the antenna mounting is driven to bring the antenna heading and object bearing into coincidence, the gyroscope precession signal is eliminated and the antenna mounting movement returns the gyroscope operated potentiometer to its electrical starting or null point, thus eliminating the servo motor signal. The radio antenna is thereby caused to continually follow the selected object, keeping the antenna heading in coincidence with the antenna-to-object bearing. If desired, the above-described object tracking movements of the antenna mounting may in turn be used, through the intermediary of a potentiometer having a signal output variable in accordance with the antenna movements relative to the body of a missile or other vehicle upon which the antenna is mounted, to cause the missile's or vehicle's heading to coincide with the antenna heading, thus directing the missile to the object in a homing manner, along either a pursuit or collision course, as desired.

A further highly significant aspect of the present invention is in the provision of a stabilized antenna. In the absence of a gyroscope precession signal, the gyroscope provides a stable reference in space regardless of independent movements of the antenna. Therefore, any independent movement of the antenna upsets the physical relation between the gyroscope and the potentiometer controlled by it to issue a servo actuating signal and immediately drive the antenna back to its original position. This stabilization may be spoken of as antenna memory and functions to keep the antenna fixed in space until a new position is demanded by gyroscope precession.

It is, therefore, one object of the present invention to provide a directional intelligence system for following the movements of selected objects or targets.

Another object of the present invention is to provide a system for driving a movably mounted directional intelligence system in response to target or object bearing information obtained thereby, for causing said directional intelligence system to adopt a heading toward the target or object and to move in accordance with the target's movements, thus maintaining an on target heading.

Another object of the present invention is to provide for the movement of a directional intelligence system in correspondence with the movements of a selected object or target, and to keep the system directed toward said object or target by means of the target bearing directional information obtained by said system, and if desired to utilize the intelligence system heading to guide a missile or other vehicle upon which it is mounted toward the object or target.

Another object of the present invention is to provide a homing system for guidance of a missile carrying said system toward a selected target or object.

Another object of the present invention is to provide a stabilized antenna for directionally transmitting and/or receiving radiant energy.

Figure 2:
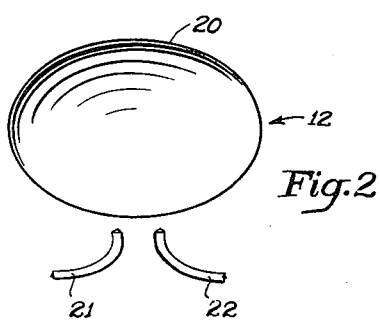

Other objects and advantages of the present invention will become apparent to those skilled in the art from a consideration of the following detailed description thereof, made in conjunction with the accompanying drawings in which:

FIG. 1 is a schematic view of a radar antenna system embodying the present invention, and shown mounted on a missile for guiding the same; and FIG. 2 is a front view of a radar antenna which may be employed in conjunction with the system illustrated in FIG. 1.

The following detailed description of one embodiment of the present invention is presented merely by way of example, and it is not intended that the scope of the invention be limited thereto. Therefore, although the herein described embodiment is specifically described as utilizing an active radar system for obtaining antenna-to-object bearing information and using the antenna heading for guiding a missile, it is apparent that other directional intelligence means may be utilized, vehicles other than missiles may be controlled thereby, and the radiation system may be active or semi-active (i.e. either energy transmitting and echo energy receiving, or merely energy receiving). Also, the portion of the invention relating to the stabilized antenna may be utilized for other purposes than guiding vehicles.

Referring now to the drawings, numeral 10 generally indicates the body of a missile which houses a homing intelligence and guidance control system generally indicated by numeral 11. A directional radar antenna 12, a radar transmitter 13, a radar receiver 14, a differential amplifier 15, a gyroscope 16, and gyroscope controlled potentiometers 16a and 16b may all be carried by a mounting plate 17, although only the radar antenna and gyroscope and associated potentiometers need of necessity be mounted thereon for practicing the described embodiment. The mounting plate 17 is supported by the gimbal ring 18 for rotation about two perpendicular axes, about a vertical axis on pivots 33 and 34 and about a horizontal axis on pivots 61 and 62.

The radar antenna, transmitter, and receiver units 12, 13, and 14 may be of any conventional design or type desired so long as the radar system functions to measure and indicate the direction of discrepancy between the radar antenna heading and the actual antenna-to-target bearing. Where it is of interest to obtain such information in one plane only, such as in azimuth, it has been found desirable to employ an antenna of the type shown in FIG. 2, comprising two energy feeds 21 and 22 spaced from each other in the horizontal plane and directed toward a parabolic directional reflector 20. In the operation of an antenna of this type, transmission radar pulses are conducted through both feeds 21 and 22 simultaneously and directed against the reflector 20, from whence they are reflected forwardly. After the transmission of such a pulse, one feed for example 21, is blocked and the echo pulse reflected from the object being followed by the antenna enters the other feed 22 and is conducted to the radar receiver 14. Thereafter, a second transmission pulse is simultaneously transmitted through feeds 21 and 22 and directed against the reflector 20. Feed 22 is then blocked to reception and the echo pulse obtained from this transmission is received through the feed 21 and conducted to the radar receiver. This process of intermittent pulse transmission simultaneously through both feeds 21 and 22, followed by a reception of the echo pulses alternately through one then the other of the two feeds, is continually maintained during operation of the present device, and because of the horizontal displacement of the two feeds 21 and 22 from each other with respect to the center of the parabolic reflector 20, the powers of the echo pulses received through one feed as compared with those received through the other feed are equal only when the antenna heading is coincident with the azimuth antenna-to-object bearing, and discrepancies thereof are substantially proportional to the amount of antenna heading error and in addition indicate the direction of error.

When utilizing a radar system of the type above indicated, the direction of error between the antenna heading and antenna-to-target bearing and the amount of such error may be interpreted by the differential amplifier 15 receiving the video signals of the radar receiver resulting from the echo pulses alternately conducted through the two antenna feeds 21 and 22. The output of the differential amplifier 15 is appropriately applied to precession coils of the gyroscope 16 carried by the antenna mounting plate 17, the direction and amount of precession force applied to the gyroscope by the coils being thus determined by the direction and amount of error between the antenna heading and the antenna-to-target bearing as indicated by the differences in powers between the echo pulses received through the feed 21 and those received through the feed 22. The details of a suitable radar system and differential amplifier circuit for accomplishing these purposes will be readily apparent to those skilled in the art. The resultant precession of the gyroscope gimbals is utilized to vary the position of a tap of a potentiometer associated with the gyroscope and indicated by the numeral 16a, to thus vary the output signal thereof. This potentiometer is part of a servo loop, and its signal is utilized in any desired manner to actuate the servo motor 30, which in turn operates to rotate the antenna mounting plate 17 upon its pivots 33 and 34 through a gear train or the like indicated by the numerals 31 and 32. When by this rotating action of the plate 17, which is initiated by a discrepancy between antenna heading and antenna-to-object bearing, the heading of the radar antenna 12 is brought into coincidence with the antenna-to-object bearing, the output of the differential amplifier 15 and the precession force exerted on the gyroscope 16 is thereby reduced substantially to zero, and through this rotation of the plate 17 the position of the potentiometer tap is returned to its original electrical null point upon the potentiometer slide wire, thus deactivating the servo motor 30 to leave the radar antenna 12 in the desired azimuth heading, directed toward the target. Since the gyroscope 16 and its potentiometer 16a are mounted with the antenna 12 on the plate 17, and since the gyroscope provides a stable reference in space unless precessed, any attempt on the part of the mounting plate 17 to move the antenna in azimuth from a heading coincident with the object bearing is immediately checked, for the movement of the potentiometer with the plate is relative to the reference gyroscope. The resultant potentiometer signal immediately activates the above-mentioned servo loop, causing the servo motor 30 to return the plate and antenna to its initial position. Thus, the antenna is stabilized in azimuth regardless of the presence or activation of the radar system, providing a memory of the antenna heading. However, upon movement of the target away from the established heading of the antenna 12, the gyroscope is precessed causing the antenna to follow the target substantially immediately through rotation of the plate 17 to establish a new stabilized antenna heading.

As previously indicated, the target following action of the radar antenna may be employed to guide the missile 10, or other vehicle upon which the present radar and directional control systems are carried, in the plane of antenna tracking being had. As one method of accomplishing this end, a potentiometer 40, whose slide wire or the like is fixed in position with respect to the above-described rotation of the antenna and its mounting plate on pivots 33 and 34, has its tap mechanically linked to the plate 17 so that rotation of the plate in azimuth with respect to the missile operates to vary the position of the tap upon the slide wire. The output of this potentiometer resulting from such azimuth rotation of the antenna and mounting plate is fed to an autopilot 50, which in turn responds to this signal by operating the missile's directional control surfaces such as rudders, ailerons, elevators, or the like. Upon the missile heading coming into coincidence with that of the antenna, the position of the tap of potentiometer 40 is returned to its initial electrical null point upon its slide wire, eliminating the signal therefrom to the autopilot, thus causing the missile to hold its new heading in correspondence with that of the antenna 12. Therefore, rotation of the antenna 12 and its mounting plate 17 upon the pivots 33 and 34 with respect to the missile 10, results substantially immediately in actuation of the control surfaces of the missile to bring its heading into correspondence with that of the antenna. While conversely, when the hereinabove described directional control system is utilized for azimuth guidance, yawing of the missile off its heading in correspondence with that of the antenna also results in a substantially immediate actuation of its control surfaces to guide its heading back into correspondence with that of the antenna. Also, if yawing of the missile results in a turning torque on the antenna mounting plate through friction of the pivots 33 and 34 or the like, such action susbtantially immediately results in a signal from the gyroscope controlled potentiometer 16a to actuate the servo motor 30 through its servo loop to hold the antenna on its correct heading as a result of the antenna azimuth stabilization action above-described. But if yawing be so sudden and of such magnitude that the action of the gyroscope on the potentiometer 16a is in itself insufficient to hold the antenna on its heading, then an off target heading precession signal would be established by the differential amplifier 15, precessing the gyroscope 16 to further aid in returning the antenna to an on target or on object heading.

Because of the possibility of pitch in the missile during its flight, it is apparent that the antenna and its mounting plate must be made adjustable in elevation to compensate for missile pitch, in order that the beam of the directional antenna 12 may be kept on the target or object to obtain the information necessary for maintaining the above-described azimuth control. To this end, a second potentiometer 16b is controlled by the gyroscope, but in the preferred embodiment of the present invention it is not controlled through precession of the gyroscope but merely through its stability in elevation. Thus, any rotation of the plate 17 upon the pivots 61 and 62 away from a preset angle thereof with true horizontal results in a corresponding variation of the position of the tap of gyroscope controlled potentiometer 16b upon its slide wire, because of the vertical stability of the gyroscope 16. This potentiometer 16b is also a part of a servo loop, so that elevation variations of the position of plate 17 result in actuation of the servo motor 63 by the signal caused to issue from potentiometer 16b. The servo motor 63 is connected to the pivot 61 through a suitable gear train 64 and 65 or the like for rotating the gimbal ring 18 and plate 17 in elevation. Thus, an attempt by the mounting plate 17 to vary its position from a predetermined angle with true horizontal, as may be caused by unbalance of the mounting plate and the equipment carried thereby or by pitch of the missile exerting a frictional torque upon the gimbal ring 18 through its pivots 61 and 62, is immediately compensated for through the gyroscope controlled potentiometer 16b and the servo motor 63 actuated thereby to return the mounting plate 17 to its predetermined elevation angle. As is readily apparent, this vertical antenna stabilization is accomplished through a servo loop substantially similar to that which effects the azimuth stabilization, and the two loops together provide a completely stabilized antenna.

The embodiment of the present invention hereinabove described is intended primarily for following a selected object or target and the guidance of a missile or other vehicle toward the object or target in only one plane of operation, as for example in azimuth. It is here contemplated that through an altimeter control means or the like the missile 10 may be set to travel at a substantially level course at a fixed altitude, while the antenna will follow the movement of the target or object in azimuth, and thereby continually guide the missile in azimuth on an on target course. The elevation control here exerted over the plate 17 through the gyroscope 16 and potentiometer 16b is therefore preset to stabilize the plate at a predetermined elevation angle with respect to true horizontal at substantially all times during the operation of the device. However, if desired, the principles of the present invention as hereinabove taught for azimuth directional guidance may be employed to modify the present embodiment to obtain elevation directional guidance as well while still maintaining complete antenna stabilization. For this purpose two radar systems may be employed, one for obtaining the azimuth intelligence above-described and the other for obtaining corresponding elevation intelligence: the hereinabove described azimuth directional control system for actuating the servo motor 30 may be employed for directing the azimuth antenna, and the potentiometer 40 may be utilized for directing the missile in azimuth in accordance with the antenna heading; while a parallel system may be utilized for actuating the servo motor 63 to direct the elevation antenna, and an elevation potentiometer corresponding to potentiometer 40 may be employed for controlling the elevation heading of the missile to bring it into correspondence with that of the elevation antenna. This biplanar directional control may be carried out with either two separate antenna mounting plates 17, one for azimuth and one for elevation, or with but a single plate for both the elevation and azimuth antennae.

There is thus described a system for controlling the directional heading of a radar antenna causing it to follow the movements of a selected target or object, wherein the movements of said antenna in following said object or target are initiated in response to the differences between the antenna heading and the antenna-to-target bearing as measured by the radar system itself. And in addition, the present invention further contemplates the utilization of such a system for directing and guiding the course of a missile, vehicle, or the like toward the selected object or target. Also, the present invention provides a stabilized antenna, stabilized independently of intelligence system operation, for enhancing the operation of the directional heading system and the guidance which may be effected thereby. The specific embodiment herein described is intended to be only exemplary of the present invention, and modifications of this embodiment apparent to those skilled in the art and within the spirit and scope of the invention as defined by the appended claims are included within the contemplation of the present patent.

The invention described herein may be manufactured and used by or for the Government of the United States of America for governmental purposes without the payment of any royalties thereon or therefor.

What is claimed is:

1. A device for tracking the movements of an object comprising a rotatable mounting means, a directional radio transmitting-receiving means carried by said mounting means for rotational movement therewith for continually indicating the bearing of the object therefrom, a gyroscope carried by said mounting means, means for applying a precession force to said gyroscope in accordance with the discrepancy between the object bearing and the heading of said directional radio means, a variable potentiometer carried by said mounting means for rotation with said directional radio means and controlled by said gyroscope to issue a signal in accordance with the precession of said gyroscope relative to the heading of said directional radio means, and servomotor means controlled by said potentiometer signal for rotating said mounting means, thereby adjusting the directional heading of said radio means in accordance with the gyroscope precession to bring it into correspondence with the bearing of said object therefrom, thus eliminating the precession force applied to said gyroscope and eliminating said potentiometer signal resulting from said gyroscope precession.

2. A device for guiding a vehicle to a selected object comprising a directional radio transmitting-receiving means mounted on the vehicle for continually indicating the bearing of the object therefrom, a mounting means therefore pivotable with respect to said vehicle, a gyroscope mounted on said mounting means, means for applying precession forces to said gyroscope in accordance with the discrepancy between the directional heading of said radio means and the bearing of the object therefrom, a variable potentiometer mounted on said mounting means and controlled by said gyroscope to issue a signal in accordance with the amount of gyroscope precession, servomotor means responsive to said potentiometer signal for driving said movable mounting means to bring the directional heading of said radio means into correspondence with the object bearing, a second variable potentiometer issuing a signal in accordance with the discrepancy between the vehicle heading and that of the directional radio means, and an autopilot responsive to the signals issuing from said second mentioned potentiometer for controlling the heading of said vehicle to bring it into a determined relationship with that of the directional radio means.

3. A stabilized directional antenna system comprising a directional antenna, a gyroscope providing a stable reference in space, a potentiometer controlled by said gyroscope, a gimbal mounted plate for carrying the foregoing elements, a servo loop controlled by said potentiometer for rotating said plate, and antenna actuated means for precessing said gyroscope, precession of said gyroscope resulting in a potentiometer signal for activating said servo loop to rotate said plate in accordance with the resultant gyroscope position, rotation of said plate in the absence of gyroscope precession resulting in a potentiometer signal and consequent activation of said servo loop to position said plate in accordance with gyroscope position.

(References on following page)

References Cited in the file of this patent

UNITED STATES PATENTS

| | | |
|---|---|---|
| 1,958,258 | Alexanderson | May 8, 1934 |
| 2,420,017 | Sanders | May 6, 1947 |
| 2,509,446 | Oplinger et al. | May 30, 1950 |
| 2,512,693 | Sparks et al. | June 27, 1950 |
| 2,553,786 | Reoemske | May 22, 1951 |
| 2,557,401 | Agins et al. | June 19, 1951 |
| 2,590,574 | Robinson | Mar. 25, 1952 |
| 2,627,020 | Parnell et al. | Jan. 27, 1953 |
| 2,660,793 | Holschuh et al. | Dec. 1, 1953 |
| 2,707,400 | Manger | May 3, 1955 |
| 2,715,776 | Knowles et al. | Aug. 23, 1955 |